(12) United States Patent
Wang et al.

(10) Patent No.: US 8,474,101 B2
(45) Date of Patent: Jul. 2, 2013

(54) HINGE MECHANISM

(75) Inventors: Jin-Xin Wang, Shenzhen (CN); Jian Li, Shenzhen (CN); Lian-Cheng Huang, Shanzhen (CN); Han-Zheng Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 325 days.

(21) Appl. No.: 12/978,550

(22) Filed: Dec. 25, 2010

(65) Prior Publication Data

US 2012/0042473 A1   Feb. 23, 2012

(30) Foreign Application Priority Data

Aug. 18, 2010   (CN) .......................... 2010 2 0295861

(51) Int. Cl.
*E05D 3/06*   (2006.01)

(52) U.S. Cl.
USPC .............................................. 16/366; 16/354

(58) Field of Classification Search
USPC ............. 16/79, 282, 284, 287, 302, 312, 315, 16/354, 366
See application file for complete search history.

(56) References Cited

U.S. PATENT DOCUMENTS

| | | | | |
|---|---|---|---|---|
| 3,163,883 A * | 1/1965 | Olsson | ........................... | 16/354 |
| 4,916,926 A * | 4/1990 | Shieh | .............................. | 70/135 |
| 6,519,812 B2 * | 2/2003 | Ko et al. | ......................... | 16/354 |
| 7,832,056 B2 * | 11/2010 | Kuwajima et al. | .............. | 16/354 |
| 8,104,144 B2 * | 1/2012 | Wang et al. | .................... | 16/354 |
| 2007/0084016 A1 * | 4/2007 | Bommelmann et al. | ........ | 16/366 |
| 2008/0109995 A1 * | 5/2008 | Kuwajima et al. | .............. | 16/354 |
| 2008/0307608 A1 * | 12/2008 | Goto | ................................ | 16/366 |
| 2009/0013500 A1 * | 1/2009 | Ueyama et al. | ................. | 16/354 |
| 2009/0070961 A1 * | 3/2009 | Chung et al. | .................... | 16/354 |

* cited by examiner

*Primary Examiner* — Robert A Delisle
(74) *Attorney, Agent, or Firm* — Altis Law Group, Inc.

(57) ABSTRACT

A hinge mechanism includes two pivot shafts substantially parallel to each other, two main gears non-rotatably respectively sleeved on the pivot shafts, a transmission assembly positioned between the two pivot shafts to transmit a torque of one of the two main gears to the other in a reverse direction, and a connecting member defining two shaft holes. The pivot shafts are respectively rotatably received in the shaft holes. Two contact assemblies are respectively mounted on the pivot shafts abutting the connecting member. One of the connecting member and each main gear forms at least one detent, and the other defines at least one recess correspondingly. The at least one detent is received in the at least one recess.

15 Claims, 3 Drawing Sheets

HINGE MECHANISM

BACKGROUND

1. Technical Field

The present disclosure generally relates to hinge mechanisms and, more particularly, to a hinge mechanism applied in an electronic device.

2. Description of Related Art

Many electronic devices employ hinged elements. To ensure that one part of the electronic device is capable of rotating relative to another part thereof, a hinge mechanism applied in an electronic device often includes a first bracket, a second bracket, and two pivot shafts. The first and second brackets are respectively sleeved on the pivot shafts. The hinge mechanism further includes other elements, such as a plurality of friction members, resilient members, and fasteners sleeved on the pivot shafts to provide axial force between the elements.

In use, the first bracket is rotated, and it drives one of the pivot shafts to rotate relative to the other one of the pivot shafts. Therefore, the two parts of the electronic device are capable of rotating relative to each other.

However, to open or close the electronic device, continuous force on one part of the electronic device is required, which may add time.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

The hinge mechanism as described in the embodiment as presented herein may be applied in any electronic device having two or more hinged parts, such as notebook computers, LCD monitors, and DVD (digital video disc) players.

Figure 1:
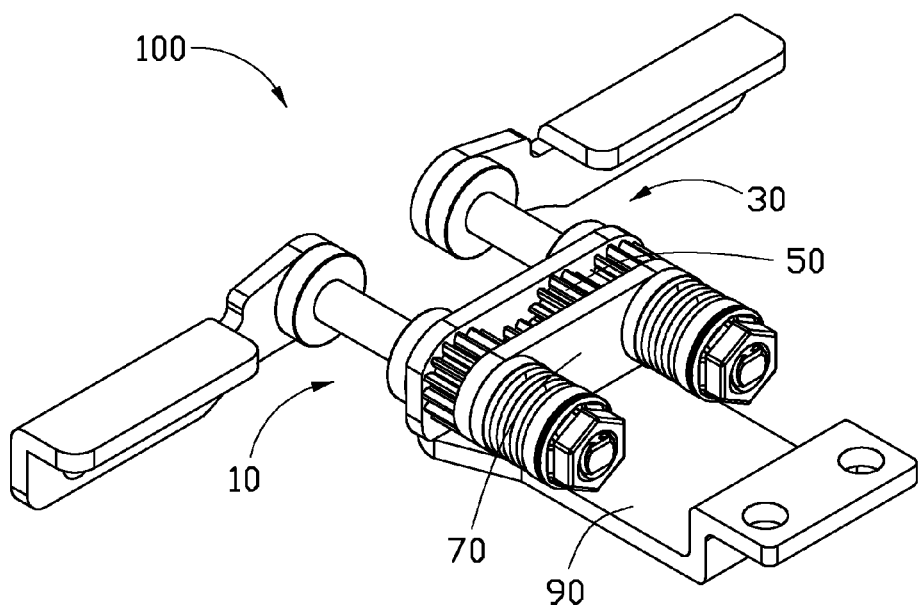
FIG. 1 is an assembled, isometric view of one embodiment of a hinge mechanism including a main gear and a connecting member engaging the main gear.
Figure 2:
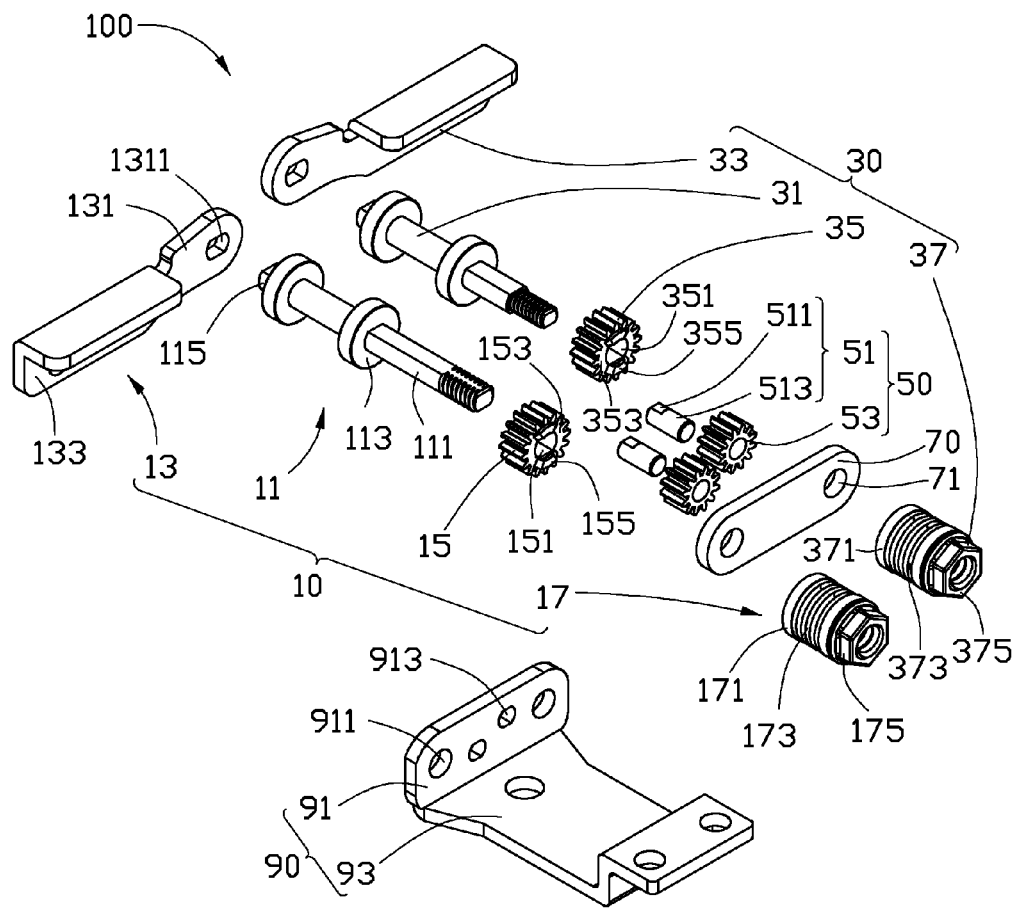
FIG. 2 is an exploded, isometric view of the hinge mechanism of FIG. 1.

Referring to FIGS. 1 and 2, one embodiment of a hinge mechanism 100 includes a first rotation assembly 10, a second rotation assembly 30, a transmission assembly 50, a connecting member 70, and a bracket 90. The first and second rotation assemblies 10, 30 are substantially parallel. The transmission assembly 50 is positioned between the first and second rotation assemblies 10, 30.

The first rotation assembly 10 includes a pivot shaft 11, a pivot leaf 13, a main gear 15, and a contact assembly 17 sleeved on the pivot shaft 11 in that order.

The pivot shaft 11 includes a shaft portion 111 having a non-circular cross section, a flange 113, and a connecting portion 115. The flange 113 is positioned between the shaft portion 111 and the connecting portion 115. The connecting portion 115 has a non-circular cross section. A distal end of the non-circular shaft portion 111 forms a threaded segment (not shown).

The pivot leaf 13 includes a pivoting portion 131 and a mounting portion 133. The pivoting portion 131 defines a pivot hole 1311 corresponding to the connecting portion 115 of the pivot shaft 11. The mounting portion 133 can be fixed to one part of an electronic device (not shown), such as a cover or a base body of the electronic device.

Figure 3:
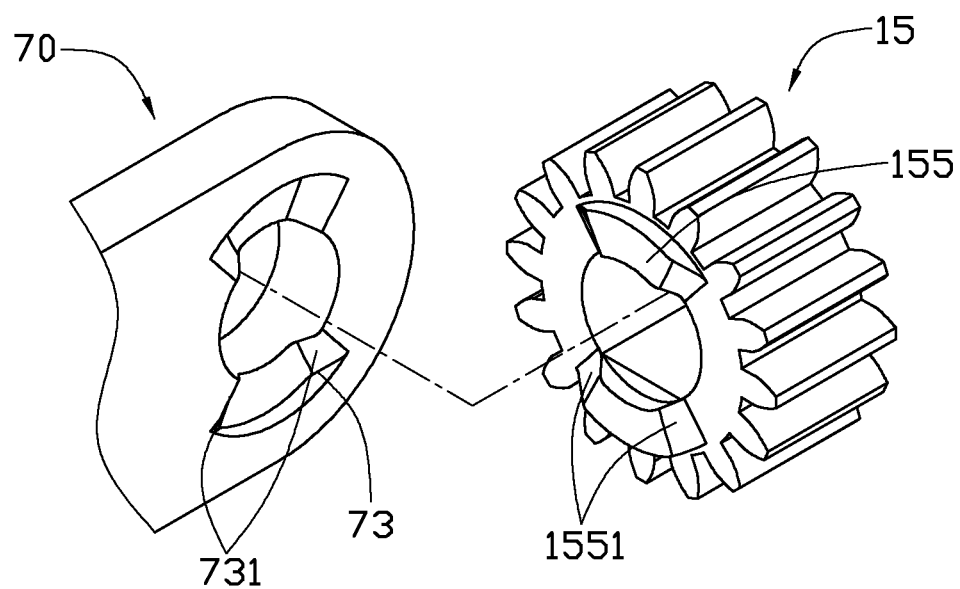
FIG. 3 is an exploded, isometric view of the main gear and the connecting member of the hinge mechanism of FIG. 1.

Referring also to FIG. 3, the main gear 15 defines a non-circular central hole 151, and has an end surface 153. The end surface 153 forms two opposite detents 155 on the outer edge portion thereof. Each detent 155 is curved and concentric to the central hole 151. Each detent 155 forms two guide surfaces 1551 positioned on opposite ends and connected to the end surface 153. In this embodiment, the guide surface 1551 is angled with respect to the end surface 153. Alternatively, the guide surface 1551 may be a substantially circular surface.

The contact assembly 17 includes a washer 171, a biasing element 173, and a securing element 175. The biasing element 173 is sandwiched between the washer 171 and the securing element 175.

The second rotation assembly 30 has the same structure as the first rotation assembly 10, and also includes a pivot shaft 31, a pivot leaf 33, a main gear 35 defining a central hole 351, and a contact assembly 37 mounted around the pivot shaft 31. The main gear 35 defines an end surface 353. The end surface 353 forms two detents 355 on the outer edge portion thereof. Each detent 355 is curved and concentric to the central hole 351. The pivot shafts 11, 31 are substantially parallel.

The contact assembly 37 has the same structure as the contact assembly 17, and also includes a washer 371, a biasing member 373, and a securing member 375. The biasing member 373 is sandwiched between and abuts the washer 371 and the securing member 375.

The transmission assembly 50 includes two connecting shafts 51 and two meshed transmission gears 53 respectively rotatably mounted around the two connecting shafts 51. The transmission gears 53 respectively engage with the main gears 15, 35. Each connecting shaft 51 includes a first end 511 having a non-circular cross section and a second end 513 having a substantially circular cross section. The first end 511 is non-rotatably connected to the bracket 90, and the second end 513 is rotatably received in the transmission gear 53.

Referring also to FIG. 3, the connecting member 70 is a plate and defines two shaft holes 71 adjacent to opposite ends thereof and two symmetrical recesses 73 which are respectively concentric to and around the shaft holes 71. The shaft hole 71 is substantially circular, and the recesses 73 are curved. Each recess 73 forms two sliding surfaces 731 on opposite ends, corresponding to the guide surfaces 1551, respectively. In the illustrated embodiment, the guide surfaces 731 and the sliding surfaces 731 are angled. Alternatively, the guide surfaces 731 and the sliding surfaces 731 can also be curved.

The bracket 90 includes a first connecting portion 91 and a second connecting portion 93 substantially perpendicular to the first connecting portion 91. The first connecting portion 91 defines two substantially circular pivoting holes 911 and two non-circular shaft holes 913 between the pivoting holes 911. The two shaft holes 913 are positioned on opposite sides of a line through the central points of the two pivoting holes 911.

During assembly of the hinge mechanism 100, the connecting shafts 51 of the transmission assembly 50 pass through the shaft holes 913 of the bracket 90, and the transmission gears 53 are rotatably mounted around the connecting shafts 51. The shaft portion 111 of the pivot shaft 11 passes through one pivot hole 911 of the bracket 90, the central hole 151 of the main gear 15, one shaft hole 71 of the connecting member 70, and the contact assembly 17. The detents 155 of the main gear 15 are engagably received in the corresponding recesses 73 of the connecting member 70. The securing member 175 is mounted securely around the threaded segment of the pivot shaft 11 thereby causing the elastic member 173 to provide a biasing force, and the first connecting potion 91 of the bracket 90 abuts the flange 113 of the pivot shaft 11. The connecting portion 115 of the pivot shaft 11 is received in the pivot hole 1311 of the pivot leaf 13, non-rotatably connecting the pivot leaf 13 and the pivot shaft 11. The second rotation assembly 30 is assembled in the same manner.

When the hinge mechanism 100 is applied in an electronic device, an external force is applied on one part of the electronic device to drive the first rotation assembly 10, for example, to rotate together with the side part of the electronic device. Engagement of the transmission gears 53 with the main gear 15 generates torque which is transmitted to the main gear 35, and further transmitted to the other part of the electronic device via the transmission assembly 50. Therefore, the two parts of the electronic device may be opened or closed at twice the speed, requiring force for a relatively short duration.

Consequently, with cooperation of the recesses 73 and the corresponding detents 155, a variable resistance for pivoting movement of the electronic device between opened and closed positions is provided. When opened, the detents 155, 355 are moved out of the recesses 73, and the biasing members 173, 373 are highly compressed, thus increased friction force is generated enabling the main gears 15, 35 to be maintained in predetermined positions. When closed, the detents 155, 355 are received in the recesses 73 to lock the electronic device. Because the detents 155, 355 are formed on the end surfaces 155, 355 of the main gears 15, 35, no additional limiting members, such as a cam, are required, simplifying the structure of the hinge mechanism 100 and presenting a compact size.

Furthermore, the main gears 15, 35 and the transmission assembly 50 are received in the receiving space defined by the connecting member 70 and the bracket 90. Thereby, dust is prevented from entering the gaps between the gears, and the gears are capable of rotating more smoothly.

It should be understood that in other embodiments, the detents 155, 355 can be formed on the connecting member 70, and the recesses 73 defined by the main gears 15, 35. The detents 155, 355 can be of other shapes, such as a spherical shape. The transmission assembly 50 can also employ chain wheels to transmit the torque.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge mechanism, comprising:
  two pivot shafts substantially parallel to each other;
  a bracket rotatably mounted around the two pivot shafts;
  two main gears non-rotatably sleeved on the two pivot shafts, respectively;
  a transmission assembly mounted on the bracket and positioned between the two pivot shafts to transmit a torque of one of the two main gears to the other in a reverse direction, wherein the transmission assembly comprises two connecting shafts and two transmission gears respectively rotatably mounted around the two connecting shafts, the two transmission gears are respectively engaged with the two main gears, each of the two connecting shafts comprises a first end having a non-circular cross section and a second end having a substantially circular cross section, the first end is non-rotatably connected to the bracket, and the second end is rotatably mounted to one of the two transmission gears;
  a connecting member defining two shaft holes, wherein the pivot shafts are respectively rotatably received in the shaft holes; and
  two contact assemblies respectively mounted on the pivot shafts and abutting the connecting member;
  wherein one of the connecting member and each main gear forms at least one detent, and the other one of the connecting member and each main gear defines at least one recess correspondingly, the at least one detent is engagably received in the at least one recess.

2. The hinge mechanism of claim 1, wherein each pivot shaft includes a shaft portion having a non-circular cross section, a flange, and a connecting portion, the flange is positioned between the shaft portion and the connecting portion, and the contact assembly is mounted on the shaft portion.

3. The hinge mechanism of claim 2, wherein the bracket abuts the flange and is rotatably mounted around the shaft portion.

4. The hinge mechanism of claim 3, wherein the bracket comprises a first connecting portion rotatably mounted around the shaft portion and a second connecting portion substantially perpendicular to the first connecting portion.

5. The hinge mechanism of claim 1, wherein the at least one detent is formed on one surface of the main gear, and the at least one recess is defined on an end surface of the connecting member.

6. The hinge mechanism of claim 5, wherein the at least one detent comprises two opposite detents formed on an outer edge portion of the main gear.

7. The hinge mechanism of claim 6, wherein the main gear defines a non-circular central hole, and the shaft portion of the pivot shaft has a non-circular cross section non-rotatably received in the central hole.

8. The hinge mechanism of claim 7, wherein each detent is curved and substantially concentric to the central hole.

9. The hinge mechanism of claim 1, wherein the at least one detent forms two guide surfaces positioned on opposite ends thereof.

10. The hinge mechanism of claim 1, wherein the contact assembly comprises a washer, a biasing element, and a securing element mounted securely around the pivot shaft, and the biasing element is sandwiched between the washer and the securing element.

11. The hinge mechanism of claim 1, wherein the first connecting portion of the bracket defines two substantially circular pivoting holes in which the pivot shafts are rotatably received and two non-circular shaft holes between the pivoting holes, the two shaft holes are positioned on opposite sides of a line through the central points of the two pivoting holes, and the first end is received in the non-circular shaft holes.

12. The hinge mechanism of claim 1, wherein the at least one recess forms two sliding surfaces on opposite ends, and the at least one detent forms two guide surfaces.

13. The hinge mechanism of claim 12, wherein the guide surfaces and the sliding surfaces are angled.

14. The hinge mechanism of claim 12, wherein the guide surfaces and the sliding surfaces are curved.

15. The hinge mechanism of claim 1, wherein the at least one detent is spherical.

* * * * *